(12) United States Patent
Lee et al.

(10) Patent No.: US 6,785,562 B2
(45) Date of Patent: Aug. 31, 2004

(54) WIRELESS DEVICE AND METHOD OF OPERATING THE SAME

(75) Inventors: Young Min Lee, Seoul (KR); Seong Tae Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 286 days.

(21) Appl. No.: 09/861,592

(22) Filed: May 22, 2001

(65) Prior Publication Data

US 2001/0049296 A1 Dec. 6, 2001

(30) Foreign Application Priority Data

| May 23, 2000 | (KR) | P2000-27766 |
| Oct. 4, 2000 | (KR) | P2000-58202 |
| Dec. 22, 2000 | (KR) | P2000-80423 |

(51) Int. Cl.[7] .............................................. H04Q 7/32
(52) U.S. Cl. ................ 455/566; 455/556.1; 455/556.2; 455/557; 455/550.1; 455/575.1; 455/575.3; 379/433.04; 379/433.13
(58) Field of Search ...................... 455/556.1, 556.2, 455/557, 566, 550.1, 575.1, 575.3, 90.1, 90.2, 90.3, 445, 517, 426.1, 426.2, 403, 414.1, 414.3, 422.1, 552.1, 347; D14/138, 140, 150; 345/342, 343, 346; 709/219, 218, 216; 379/433.04, 433.13

(56) References Cited

U.S. PATENT DOCUMENTS

| D326,091 S | * | 5/1992 | Kikuchi | D14/138 |
| 5,189,632 A | * | 2/1993 | Paajanen et al. | 455/556.1 |
| 5,584,054 A | | 12/1996 | Tyneski et al. | 455/89 |
| 6,038,313 A | | 3/2000 | Collins | 379/433 |
| 6,300,947 B1 | * | 10/2001 | Kanevsky | 345/343 |
| 6,324,386 B1 | * | 11/2001 | Headon | 455/550.1 |
| 6,445,932 B1 | * | 9/2002 | Soini et al. | 455/556.1 |
| 6,519,483 B1 | * | 2/2003 | Watanabe | 455/575.1 |
| 6,600,930 B1 | * | 7/2003 | Sakurai et al. | 455/566 |
| 2002/0049833 A1 | * | 4/2002 | Kikinis | 455/557 |

* cited by examiner

Primary Examiner—William Trost
Assistant Examiner—Keith Ferguson
(74) Attorney, Agent, or Firm—Fleshner & Kim, LLP (57) ABSTRACT

The cellular phone of the present invention includes a display device provided on the front surface of a main body, and a cover movable relative to and preferably, rotatably mounted on, the main body and having keypads provided on the front and rear surfaces thereof, respectively. A plurality of number keys for a mobile communication are preferably arranged on the keypad provided on the front surface of the cover, and a plurality of character keys for the Internet are preferably arranged on the keypad provided on the rear surface of the cover. Also, another keypad wherein keys for the mobile communication and the Internet are arranged may be provided on the main body. The cover may be in the form of a flip or folder. The cover may have an area smaller than the main body or a window so that a portion of the display device is exposed even when the cover is closed. Meanwhile, information that conforms with the exposed portion of the display device is provided from the server to the display device in dependence with the open/close state of the cover. The cellular phone having the improved cover can be advantageously used as a future web phone, digital phone, or Internet phone.

43 Claims, 12 Drawing Sheets

WIRELESS DEVICE AND METHOD OF OPERATING THE SAME

BACKGROUND OF THE INVENTION

1. Field of the Invention

The present invention relates to a communication device, and more particularly, to a wireless device.

2. Background of the Related Art

With the development of communication technology, wireless communication has become a necessity for everyday use. As cellular phones, or mobile phones, subscriber unit, wireless devices, etc. (collectively referred to as cellular phones) are rapidly spreading, improved functions have been continuously developed for the cellular phones.

Figure 1A:
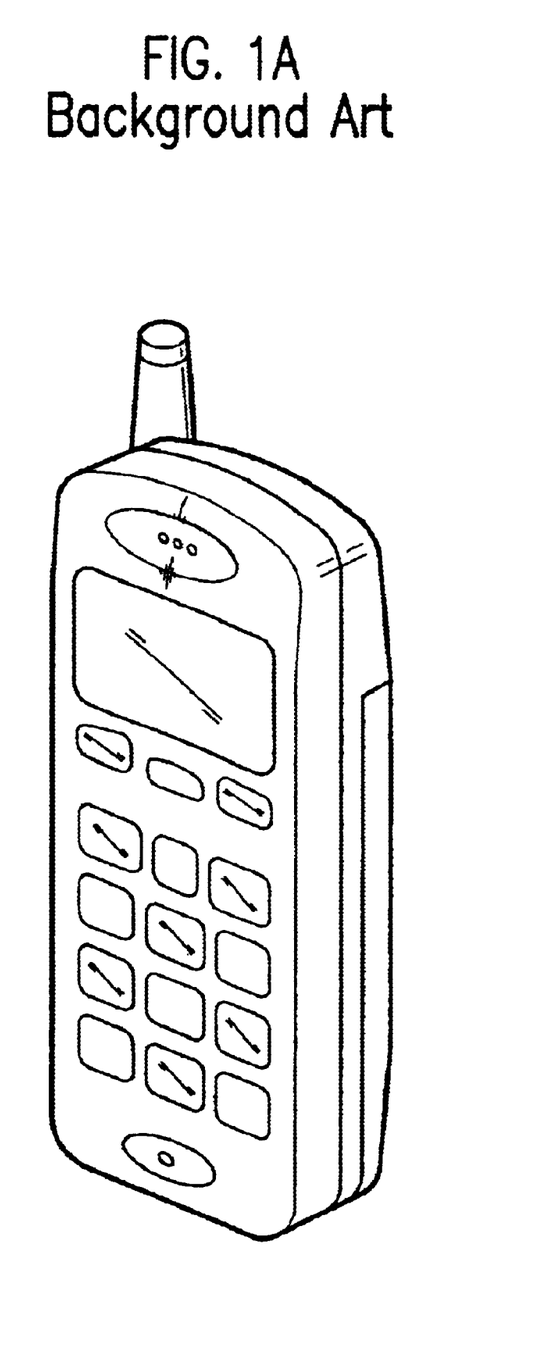
FIGS. 1A to 1C are diagrams illustrating the external shapes of the general cellular phones.
Figure 1B:
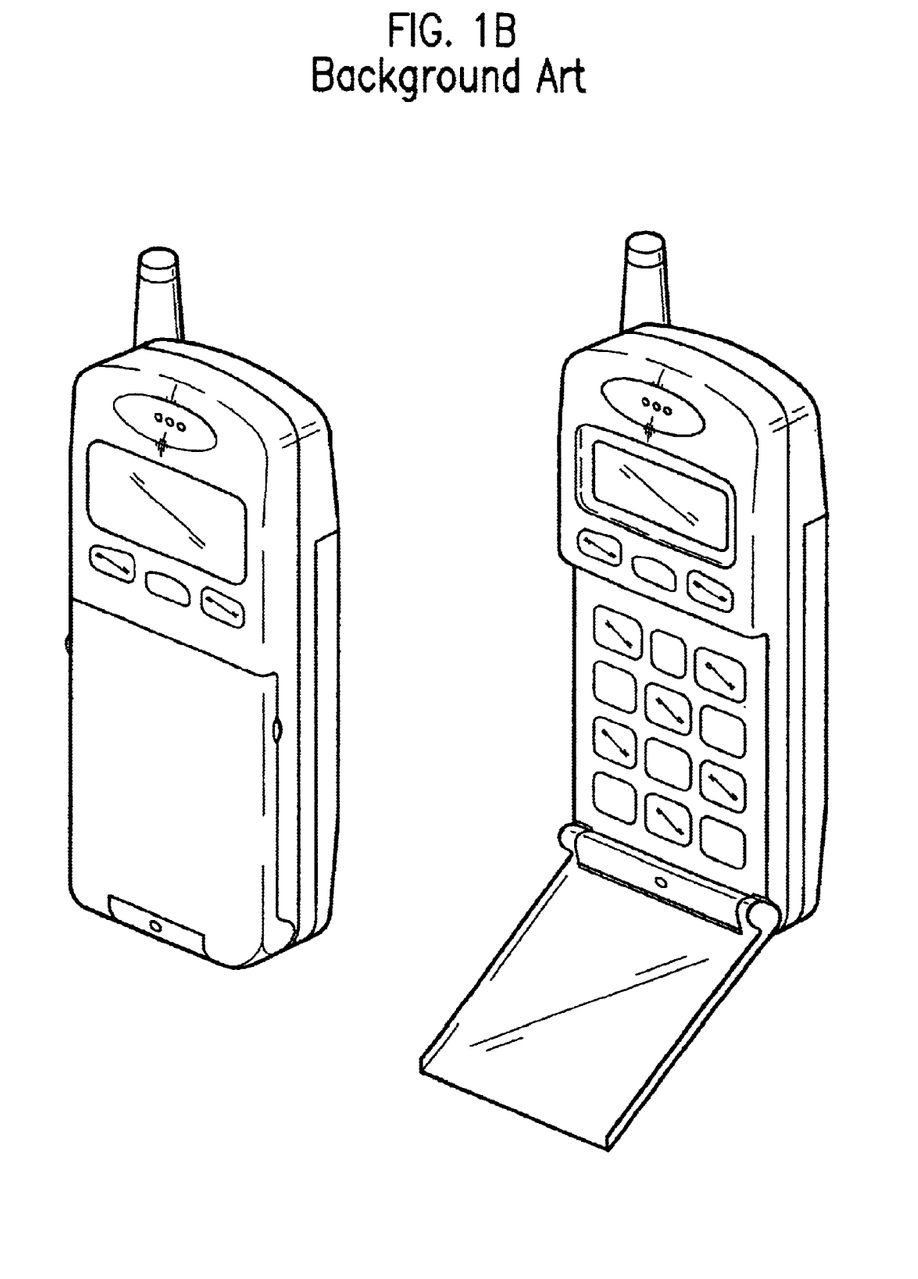
Figure 1C:
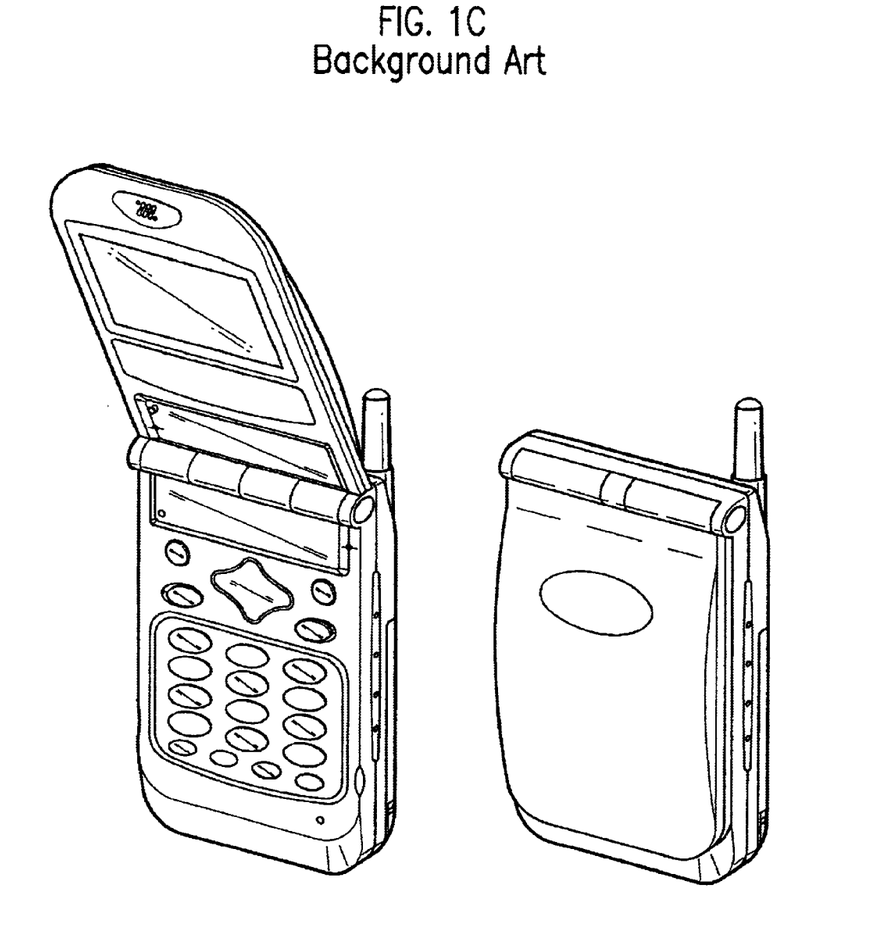

Generally, a cellular phone is classified into a bar type, flip type, and folder type. FIGS. 1A, 1B, and 1C show the external shapes of the bar-type cellular phone, flip-type cellular phone, and folder-type cellular phone, respectively.

Until now, the cellular phones have been generally used for performing an audio communication service and a data communication service. However, mobile communication service providers have recently attempted to support an Internet service, facsimile service, and diverse multimedia services through the cellular phone.

In order to support the Internet service, facsimile service, and diverse multimedia services through the cellular phone as described above, the existing structure of the cellular phone shown in FIGS. 1A to 1C is inadequate. Specifically, most cellular phones currently on the market have a keypad which is provided on the front surface of a main body of the cellular phone and in which number keys, character keys, and function keys for performing various built-in functions are arranged.

However, in order to perform the above-described Internet service and web browser function, the cellular phone is required to have more keys in addition to the above-described number keys, character keys, and function keys. Since the above-described keys and a display device are arranged together on the front surface of the main body of the cellular phone, there are restrictions for arranging more keys in addition to the above-described keys on the front surface of the main body.

Meanwhile, since the display device (mainly, a liquid crystal display (LCD)) of the cellular phones currently on the market generally has a size corresponding to about 5 word lines, which is inadequate for performing an Internet search, chatting, cyber purchasing, etc. In other words, the cellular phones require larger LCDs. However, such an increase makes it more difficult to secure more space for the arrangement of keys for supporting the Internet service on the front surface of the main body.

Meanwhile, flip-type cellular phones having a large-sized screen have been popularized so that connection to the Internet or management of personal information can be implemented using the cellular phone. However, since the display device of the cellular phone is small, it is not suitable for the browser. Also, the method of searching information and the method of defining documents that define the information of the cellular phones are different from those used in general computers.

As a result, browsers for supporting a small screen size and monochromatic screen have been newly developed. A UP-type browser, that is one among such browsers, is built in a cellular phone so as to use the Internet through the cellular phone. For example, the UP browser of 3.1 Version for searching the Internet through the cellular phone can be manipulated through the keypad corresponding to the 3.1 Version. Accordingly, a user should manipulate the keypad corresponding to the 3.1 Version in case that he/she searches the Internet through the browser or uses a pocketbook function built in the cellular phone.

Figure 2A:
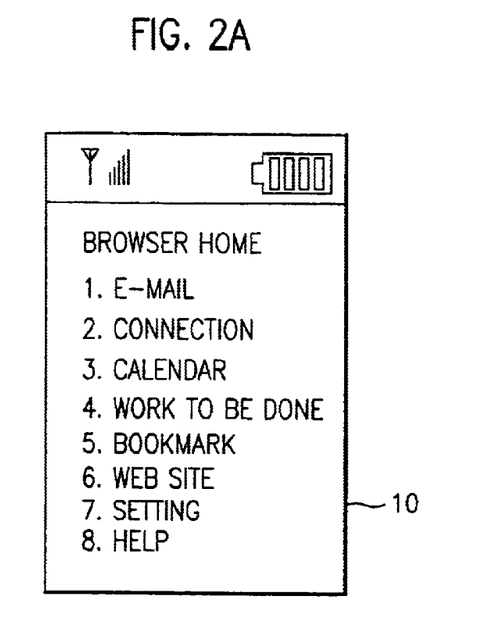
FIGS. 2A and 2B are diagrams illustrating examples of the screen of the display device of the conventional cellular phone.
Figure 2B:
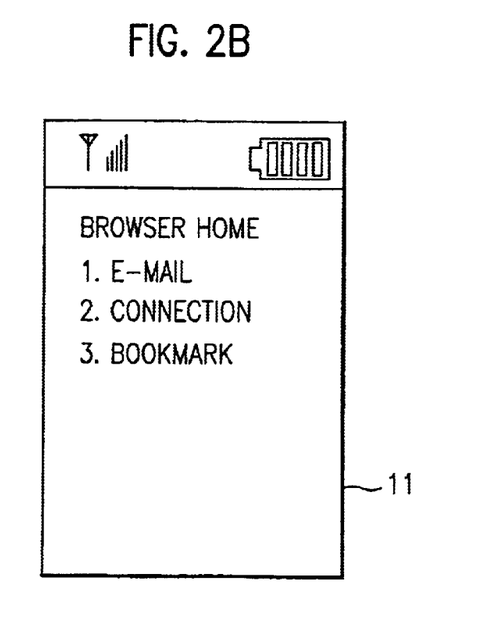

FIGS. 2A and 2B are diagrams illustrating examples of the screen of the display device of a related art flip-type cellular phone. As shown in FIG. 2A, if the flip cover of the cellular phone is opened, the full screen 10 of the display device (for example, LCD) of the cellular phone is exposed, and thus the user can view information displayed on the full screen at a glance. Meanwhile, as shown in FIG. 2B, if the flip cover is closed, only a portion 11 of the screen of the display device is exposed, and thus the user can view the displayed information from the exposed portion of the screen. That is, the user can view only a portion of the information.

As described above, the related art cellular phone has a disadvantage that the user needs to open the flip cover and then press the keypad of the main body if he/she wishes to select the displayed information when the flip cover is initially closed, causing an inconvenience for the user. Also, in order for the user to view the displayed information hidden by the closed flip, he/she needs to open the flip cover.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the invention is to provide a cellular phone that can accommodate keys for performing functions of a web phone, digital phone, or Internet phone through the cellular phone.

Another object of the present invention is to provide a cellular phone that has a plurality of keypads for performing functions of a general cellular phone and Internet phone.

Still another object of the present invention is to provide a cellular phone that can accommodate a display device of a larger size required for performing the Internet function.

Still another object of the present invention is to provide a method of operating a cellular phone that can recognize the open/close state of a cover, and display information through a display device so that the displayed information conforms with the size of the exposed portion of the display device determined in accordance with the open/close state of the cover.

In one aspect of the present invention, there is provided a cellular phone comprising a main body having a display device of a predetermined size and a keypad provided on a front surface thereof, and a cover rotatably mounted on the main body and having different keypads provided on a front surface and a rear surface thereof, respectively.

In another aspect of the present invention, there is provided a method of operating a cellular phone including a main body having a display device of a predetermined size and a keypad provided on a front surface thereof, and a cover rotatably mounted on the main body and having different keypads provided on a front surface and a rear surface thereof, respectively, the method comprising the steps of transmitting an open/close state of the cover to a server, receiving from the server information the amount of which conforms with a size of a screen of the display device corresponding to the open/close state, and displaying the received information through the display device. In order to achieve the above objects, the cover of the cellular phone has an improved structure.

As described above, the cover has the keypads provided on the front and rear surfaces thereof, respectively, and thus a space required for arranging the display device of a larger size and additional keys for the Internet service can be secured in the main body of the cellular phone. Also, the user can select desired information through a touch panel provided on at least one exposed portion of the display device, irrespective of the open/close state of the cover.

Preferably, the keypad provided on the front surface of the main body and the keypad provided on the rear surface of the main body have functions different from each other.

Preferably, the cover may have an area smaller than that of the front surface of the main body so that at least one portion of the display device provided on the main body is exposed. Accordingly, even in a state that the cover is closed and covers the main body, at least one portion of the display device is exposed.

Preferably, the cover may have the same area as that of the front surface of the main body, and be provided with a window for exposing at least one portion of the display device. Accordingly, even in a state that the cover is closed and covers the main body, at least one portion of the display device is exposed.

Preferably, on the keypad provided on the front surface of the cover are arranged a plurality of keys for inputting numbers and characters for a mobile communication, and on the keypad provided on the rear surface of the cover are arranged a plurality of keys for inputting characters and functions for a mobile Internet.

Preferably, on the keypad provided below the display device on the front surface of the main body are provided function keys for the mobile communication and mobile Internet.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The cellular phone according to a preferred embodiment of the present invention has three keypads, and a display device provided on a main body, the display device having a larger size than that of the related art cellular phones. Preferably, the cellular phone according to a preferred embodiment of the present invention has built-in function blocks and software for the mobile communication service, and built-in function blocks and software for the mobile Internet service. Further, the cellular phone according to a preferred embodiment of the present invention has a built-in wireless application protocol (WAP) browser for the mobile Internet service.

First Preferred Embodiment

Figure 3A:
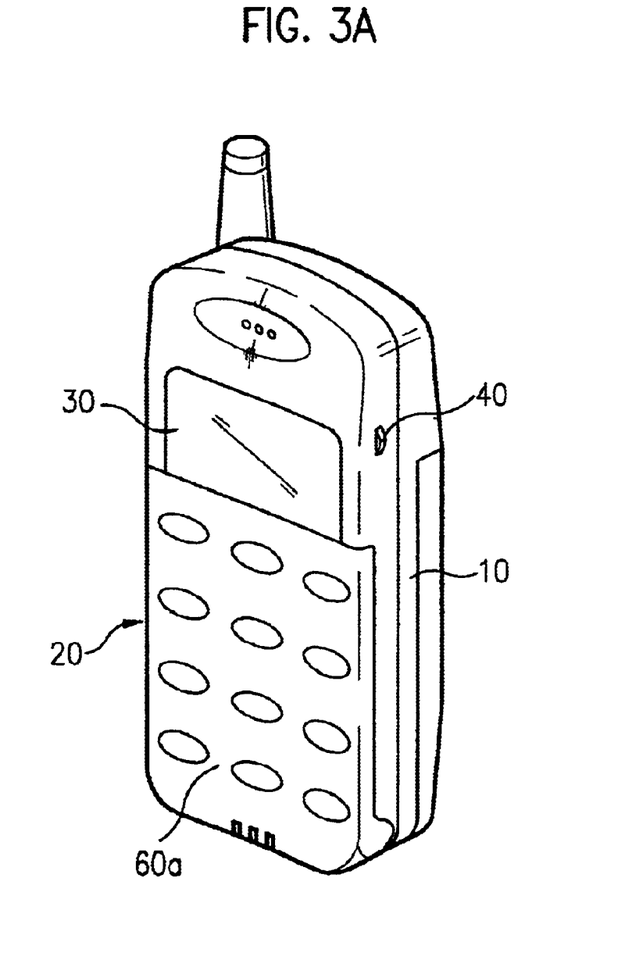
FIG. 3A is a diagram illustrating the external shape of the cellular phone with its cover closed according to a preferred first embodiment of the present invention.
Figure 3B:
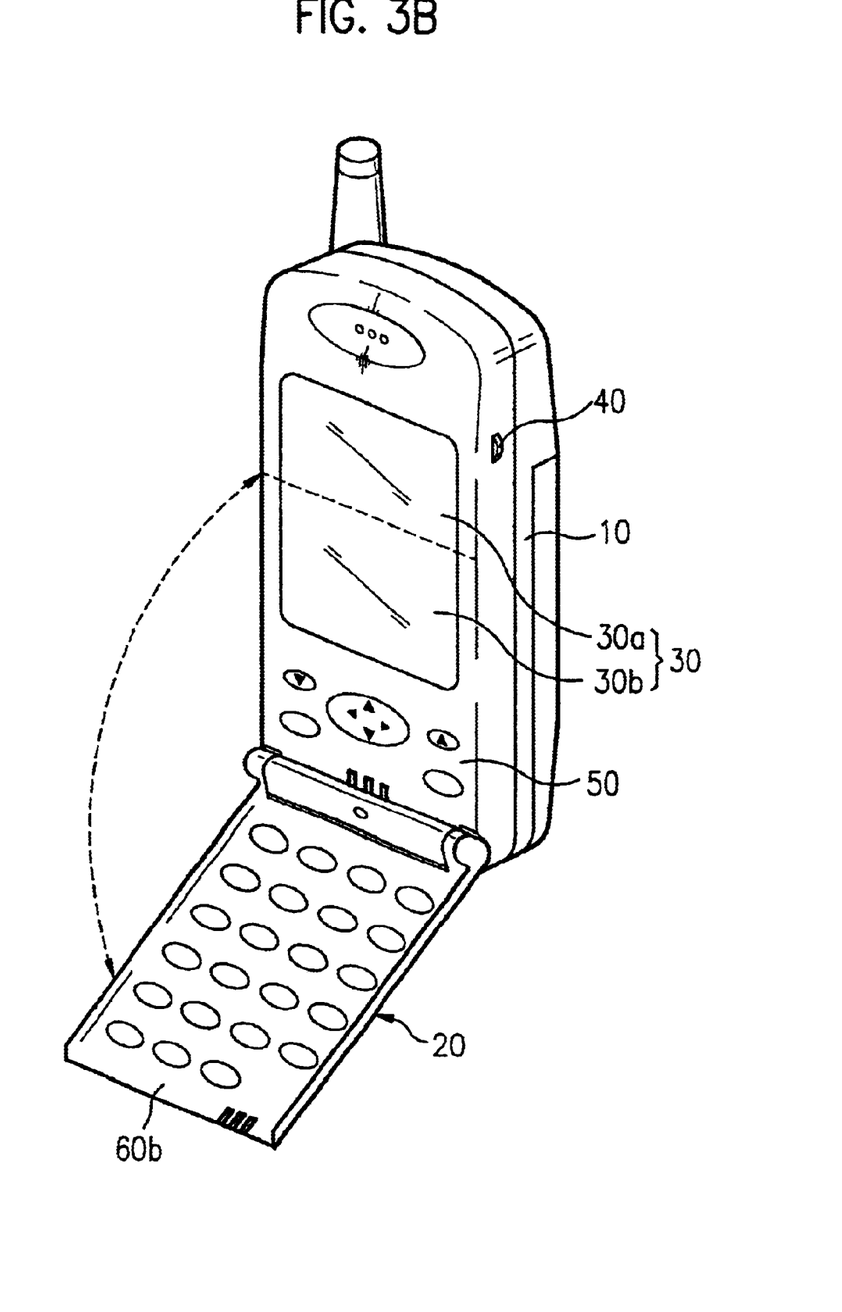
FIG. 3B is a diagram illustrating the external shape of the cellular phone with its cover opened according to the preferred first embodiment of the present invention.

FIG. 3A is a diagram illustrating the external shape of the cellular phone with its cover closed according to a preferred first embodiment of the present invention, and FIG. 3B is a diagram illustrating the external shape of the cellular phone with its cover opened according to the preferred first embodiment of the present invention.

As shown in FIGS. 3A and 3B, the cellular phone includes a main body or housing 10 and a cover 20.

The main body 10 includes a display device 30 and a keypad 50 preferably having an area smaller than that of the display device 30, both of which are provided on the front surface of the main body 30.

The cover 20 is preferably rotatably mounted on the main body 10, and has a front keypad 60a and a rear keypad 60b provided on the front and rear surfaces thereof, respectively. In the first embodiment, the cover 20 has an area smaller than that of the front surface of the main body 10, and thus, when the cover 20 is in a close state, a portion of the display device 30, i.e., an upper portion 30a of the display device 30 in the preferred first embodiment of the present invention, is exposed or revealed.

Figure 3C:
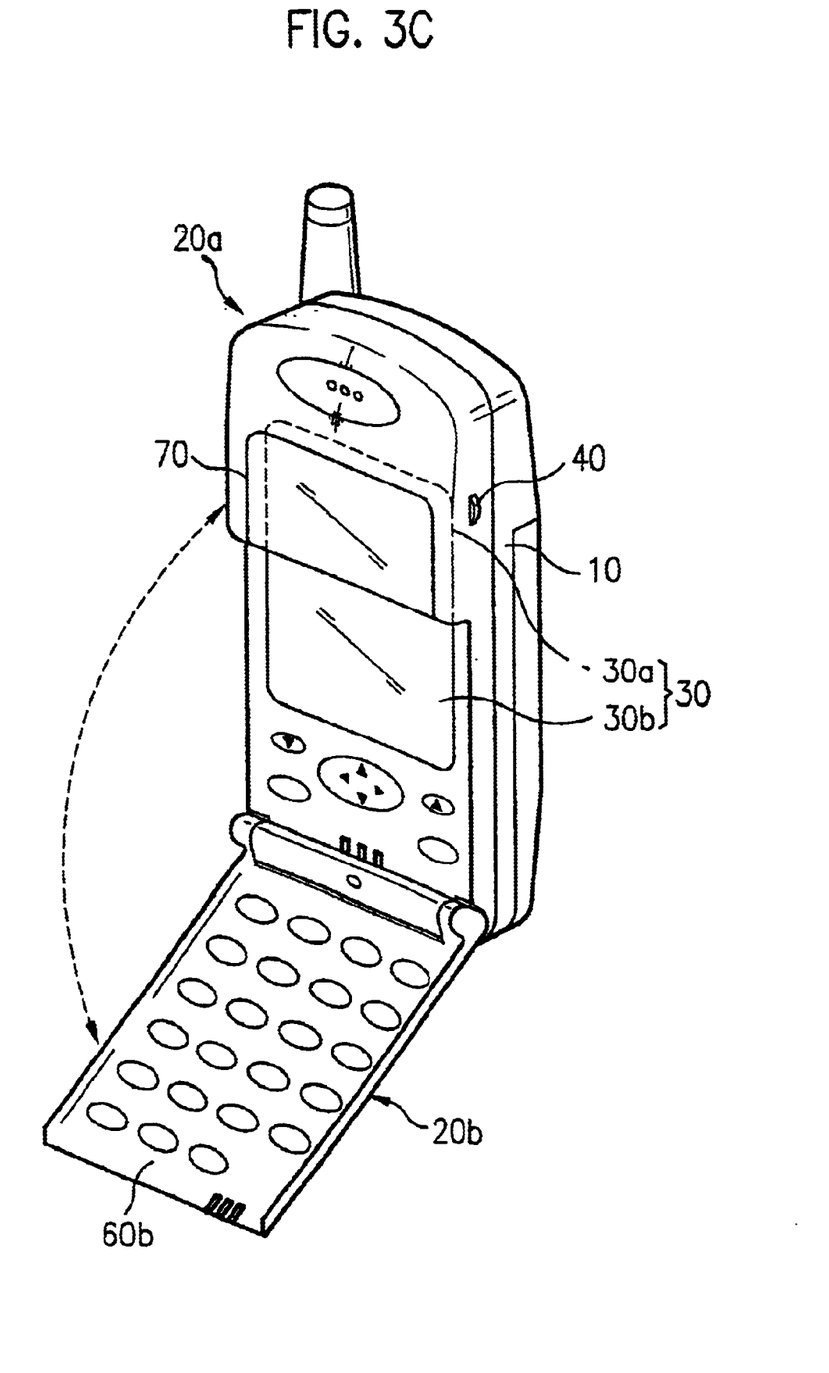
FIG. 3C is a diagram illustrating the external shape of the cellular phone with its lower cover opened according to a modified version of the preferred first embodiment of the present invention.

FIG. 3C is a diagram illustrating the external shape of the cellular phone with its lower cover opened according to a modified version of the preferred first embodiment. In this embodiment, the cover 20 is divided into an upper cover 20a and the lower cover 20b. The upper cover 20a is preferably fixed to the main body 10, and has a first window 70 for revealing the upper portion 30a of the display device 30. The lower cover 20b in FIG. 3C corresponds to the cover 20 in FIG. 3B, and the cellular phone of FIG. 3B has no upper cover 20a of FIG. 3C. Other portions in FIG. 3C are the same as those in FIG. 3B, the detailed explanation thereof will be omitted.

In FIG. 3B, the cover 20 may be the cover of the folder-type cellular phone although FIG. 3B illustrates a flip-type cellular phone. The main body 10 has a relatively large display (e.g., a liquid crystal display (LCD)), and the cover 20 rotates on the main body 10. For this rotation, a hinge in the form of a joint is provided between the cover 20 and the main body 10.

The cover 20 is opened and closed by the operation of a cam connected to the hinge. The hinge converts a rotary motion into a straight motion, and the cover 20 is opened and closed by the operation of the hinge.

Meanwhile, the flip-type cover 20 may be a general flip type or a flip-up type. This flip-type cover is connected to the hinge by a hinge shaft in the same manner as the folder-type cellular phone, and a cam is connected to the hinge so that the flip-type cover 20 is smoothly opened and closed. Also, a spring is provided to give a constant force when the flip-type cover 20 is opened and closed.

In the preferred first embodiment of the present invention, an open button 40 is provided on the side or any other suitable location of the main body 10 for opening and closing the cover 20. If the open button is pressed, the cover 20 is opened with respect to the main body 10 by the cam, hinge, and/or spring. The open button 40 may further perform the function of starting and ending the connection to the mobile communication service or mobile Internet service as well as the function of opening and closing the cover 20.

Meanwhile, a signal transmission for a telephone call is performed by pressing a SEND key arranged on the front keypad 60a after inputting a telephone number by the keys provided on the front surface of the cover 20. The signal transmission may be also performed by pressing the open button 40. If the open button 40 is pressed, a call signal corresponding to the inputted telephone number is transmitted to the opposite party, and the telephone call to the opposite party becomes possible.

Meanwhile, considering that the keys provided on the front surface of the cover may perform unwanted operations due to their exposure, the SEND key for the signal transmission may be arranged on the main body 10, or on the rear surface of the cover 20 or other appropriate location As described above, the cover 20 (or lower cover 20b of FIG. 3C) of the cellular phone according to the preferred first embodiment of the present invention has an area smaller than that of the main body 10. Accordingly, if the cover 20 is in the close state, only a portion of the display device 30, i.e., the lower portion 30b of the display device 30, is hidden by the cover 20. Thus, even when the cover 20 is in the close state, the user can use the mobile communication service or Internet service through the exposed upper portion 30a of the display device.

Specifically, in the cellular phone according to the first embodiment of the present invention, the area of the cover 20 is determined in a manner that the upper portion 30a of the display device 30 is exposed even if the cover 20 is closed. That is, in a state that the cover 20 is closed, the display device 30 is not entirely hidden by the cover 30.

On both surfaces of the cover 20, i.e., on the front and rear surfaces of the cover 20, are provided a plurality of keys (or buttons) preferably having different uses. Specifically, when the cover 20 is closed, the upper portion 30a of the display device 30 is exposed as shown in FIGS. 3B and 3C, and keys 1 required for transmission/reception of telephone numbers, which include the keys for inputting numbers and characters, are arranged on the front keypad 60a provided on the front surface of the cover 20. Accordingly, it is possible to perform the mobile communication even in a state that the cover 20 is closed.

A plurality of keys for inputting numbers and characters are arranged on the rear keypad 60b that is provided on the rear surface of the cover 20 (or lower cover 20b). Here, when the cover 20 is opened, the above-described keys become a power-on state, and this enables an additional data storage function such as the storage of telephone numbers required for the mobile communication to be performed. Also, keys for using the Internet service are arranged on the rear surface of the cover 20.

Referring to FIGS. 3A to 3C, the display device 30 that has an area larger than that of the display device of the related art cellular phone is mounted on the main body 10 of the cellular phone. As indicated as a dotted line in FIG. 3B, the display device 30 is divided into the upper portion 30a and the lower portion 30b. Only the upper portion 30a is exposed when the cover 20 is closed, while the display device 30 including the upper portion 30a and the lower portion 30b is wholly exposed when the cover 20 is opened. Also, on the keypad 50 provided under the display device 30 are arranged keys such as direction keys, multi-key, SEND key, and END key. The keys arranged on the first keypad 50 may be used for both the mobile communication and the Internet service.

In summary, the keys for the mobile communication are arranged on the front keypad 60a, and the keys for both the mobile communication and the Internet service are arranged on the rear keypad 60b and the keypad 50. As described above, the front keypad 60a is in the power-on state when the cover 20 is closed, and the keypad 50 and the rear keypad 60c are in the power-on state when the cover 20 is opened.

The above-described keys include various keys for the Internet service such as the WAP browser for using the Internet service. As the keys for the Internet service, there exist a page-up key, page-down key, hot key H1 for searching the uniform resource locator (URL) of the most preferable web site, and a hot key H2 for searching details of the web site previously connected. These hot keys H1 and H2 may be used for various other purposes.

Meanwhile, the display device 30 is in the power-on or power-off state in dependence upon the position of the cover 20. Specifically, if the cover 20 is opened, both the lower portion 30b and the upper portion 30a, which are divided by the dotted line as shown in FIG. 2B, are in the power-on state. If the cover 20 is closed, only the upper portion 30a is in the power-on state. Alternatively, the upper portion 30a and lower portion 30b may be in a power-on state when the cover is closed.

Figure 4:
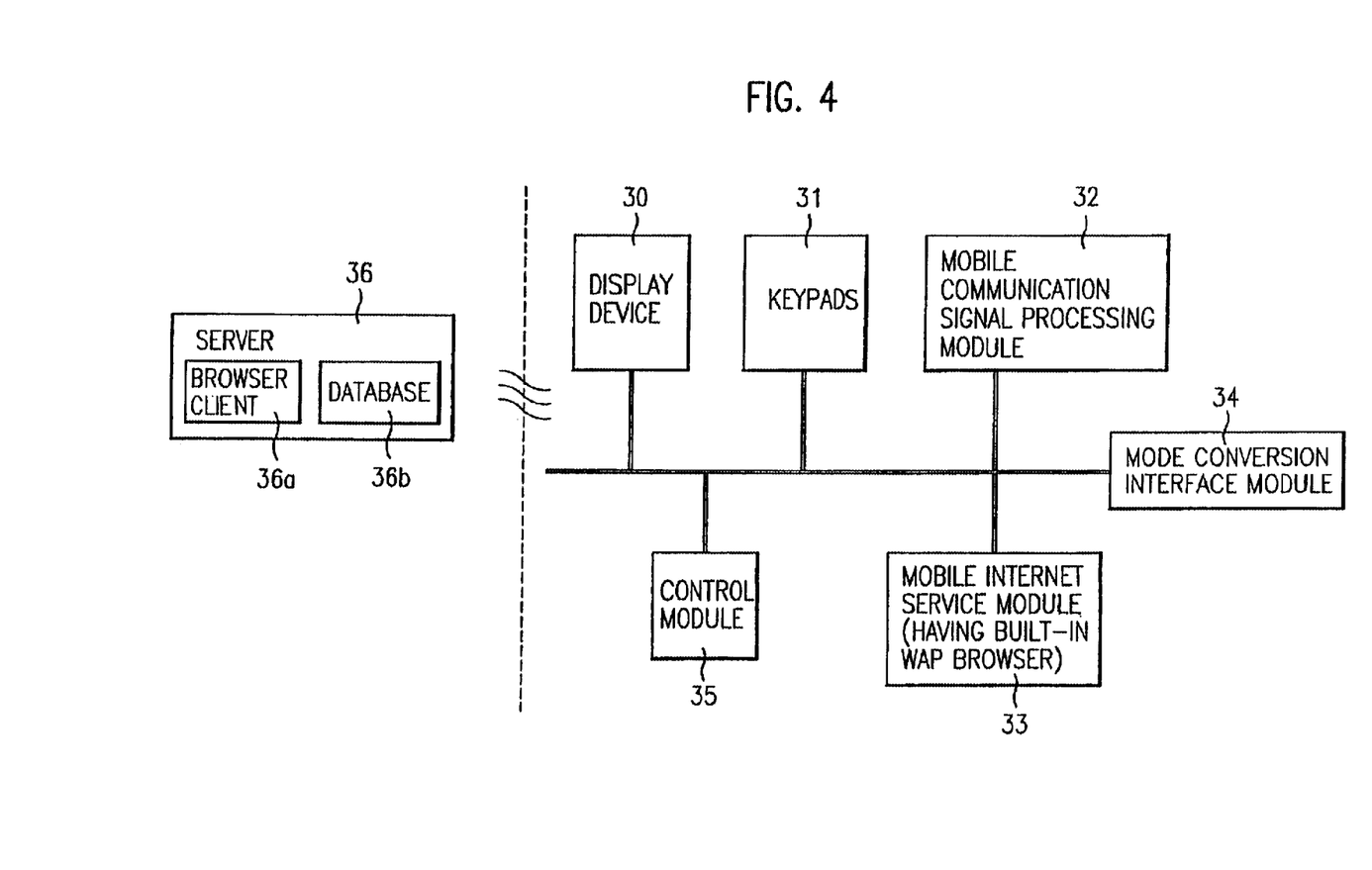
FIG. 4 is a circuit diagram illustrating the construction of the cellular phone according to a preferred embodiment of the present invention.

FIG. 4 is a circuit diagram illustrating the construction of the cellular phone according to a preferred embodiment of the present invention. Referring to FIG. 4, in order to effect the operations of the display device 30 and the keys, the cellular phone according to the present invention includes a mobile communication signal processing module 32 for performing a frequency-processing of a radio signal, signal conversion, and signal encoding and decoding, a mobile Internet service module 33, having a built-in WAP browser, for supporting a mobile Internet connection and use of the service according to the connection, a mode conversion interface module 34, and a control module 35. In FIG. 4, the reference numeral 30 denotes the display device shown in FIGS. 3A to 3C, and 31 denotes the keypads 50, 60a, and 60b. The reference numeral 36 denotes an external server, 36a a browser client, and 36b a database.

Referring to FIG. 4, the cellular phone transmits information on the open/close state of the flip to the external server 36 through an internal browser (i.e., built in the mobile Internet service module 33). The server 36 receives the information on the open/close state of the cover 20, and provides the corresponding information. The server 36 includes the database 36b for storing the information and the browser client 36a. The browser client 36a receives from the cellular phone the information on the open/close state of the cover 20, and reads out the corresponding information from the database 36b in accordance with the received information. The information read out from the database 36b is provided to the cellular phone. The open/close state of the cover 20 (of the flip type or folder type) is detected by a browser application program such as the UP-browser 3.1.

In the embodiment of the present invention, the browser application program assigns a specified region for indicating the size of the display device (for example, LCD) in a data header portion when starting the browser. Specifically, in case that the cover 20 is opened, it is indicated as '0', and in case that the cover 20 is closed, it is indicated as '1'. These '0' and '1' correspond to the size of the exposed screen of the display device 30.

The open/close state of the cover 20 can be processed as an event. In this case, whenever the corresponding event is produced, the corresponding information is transmitted to the browser client 36a. The browser client 36a recognizes the information on the size of the exposed screen from the header of the information transmitted from the cellular phone, and transmits to the cellular phone the information corresponding to the recognized information.

In case the cover 20 is opened, the browser client 36a reads out the information that corresponds to the size of the full screen from the database 36b, and transmits the readout information to the cellular phone. In case that the cover 20 is closed, the browser client 36a reads out the information that corresponds to the size of the exposed portion of the screen from the database 36b, and transmits the readout information to the cellular phone.

Meanwhile, when the information on the open/close state of the cover 20 is changed, the browser client 36a transmits the information corresponding to the screen size to the cellular phone along with a screen redrawing command.

The cellular phone redraws the contents of the screen in accordance with the screen redrawing command and the information transmitted from the server 36. If the cover 20 is in the close state, the cellular phone reconstructs the information according to the user's setting, and displays the reconstructed information on the exposed upper portion 30a of the display device 30. The user can predetermine the specified information included in a user selection menu such as a browser home or browser menu built in the cellular phone as a frequently used menu.

Meanwhile, in case that the cover 20 is closed, the cellular phone rearranges the transmitted information so that the contents (e.g., menu) predetermined by the user are preferentially displayed on the screen of the display device 30 among the information transmitted from the server 36. Accordingly, all the menu or menus predetermined by the user can be displayed on the exposed portion of the screen of the display device 30. When any one among the displayed menus is selected by the user, the server 36 transmits the information corresponding to the size of the exposed portion of the screen of the display device 30 (e.g., LCD), and thus all the transmitted information can be displayed on the exposed screen portion of a small size.

Figure 5A:
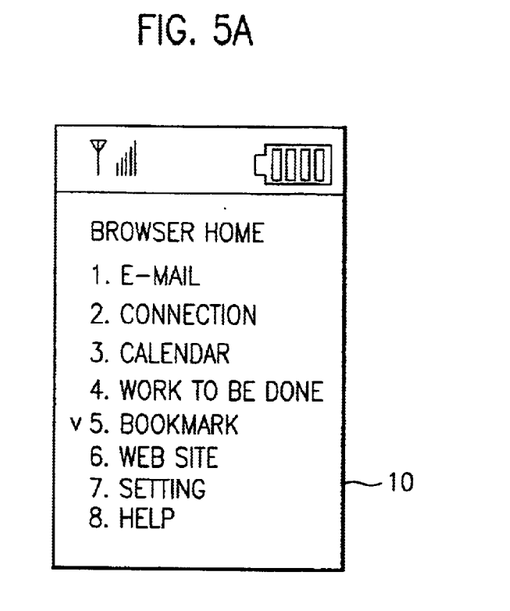
FIGS. 5A and 5B are diagrams illustrating examples of the screen of the display device according to a preferred embodiment of the present invention.
Figure 5B:
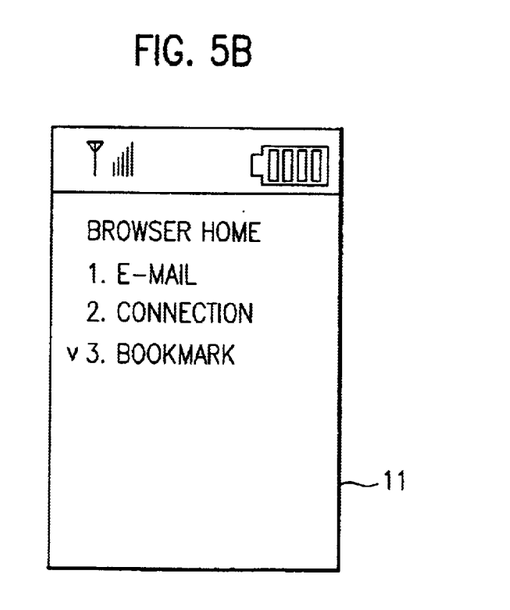

FIGS. 5A and 5B are diagrams illustrating examples of the screen of the display device according to the embodiment of the present invention. As shown in FIGS. 5A and 5B, in case the cover 20 is closed, on the exposed upper portion 30a of the display device is preferentially displayed the information predetermined by the user among the menus which are displayed on the whole portion 30a and 30b of the display device 30 when the cover 20 is opened. In FIGS. 5A and 5B, the symbol "v" indicates the menu predetermined by the user. This symbol may be or may be not displayed on the screen.

A touch panel may be installed on the surface of the display device 30 (for example, LCD). Through this touch panel, the user can select a desired one among the displayed menus. In this case, the user can select the desired menu without using the above-described keypads.

The UP-browser may have a problem in that it may not support the touch panel. This problem can be solved by first extracting the coordinate values corresponding to the information displayed on the display device 30. When the user selects a specified position through the touch panel, the coordinate values corresponding to the position are provided to the browser client 36a in the server 36. Accordingly, the same effect as the input of data through the keypad can be obtained through the touch panel. As a result, the user can freely use the Internet through the window of a small size even in case that the cover is closed, without inputting data through the keypad.

The present invention has various other advantages. For example, since the size information of the exposed display device 30 is always located on the header portion of the data transmitted from the cellular phone to the server 36, the display information that corresponds to the size of the exposed display device 30 is provided from the server 36 to the cellular phone. Thus, the compatibility between the cellular phone having a large-sized screen of the display device 30 and the cellular phone having a small-sized screen of the display device 30 can be maintained.

Figure 6:
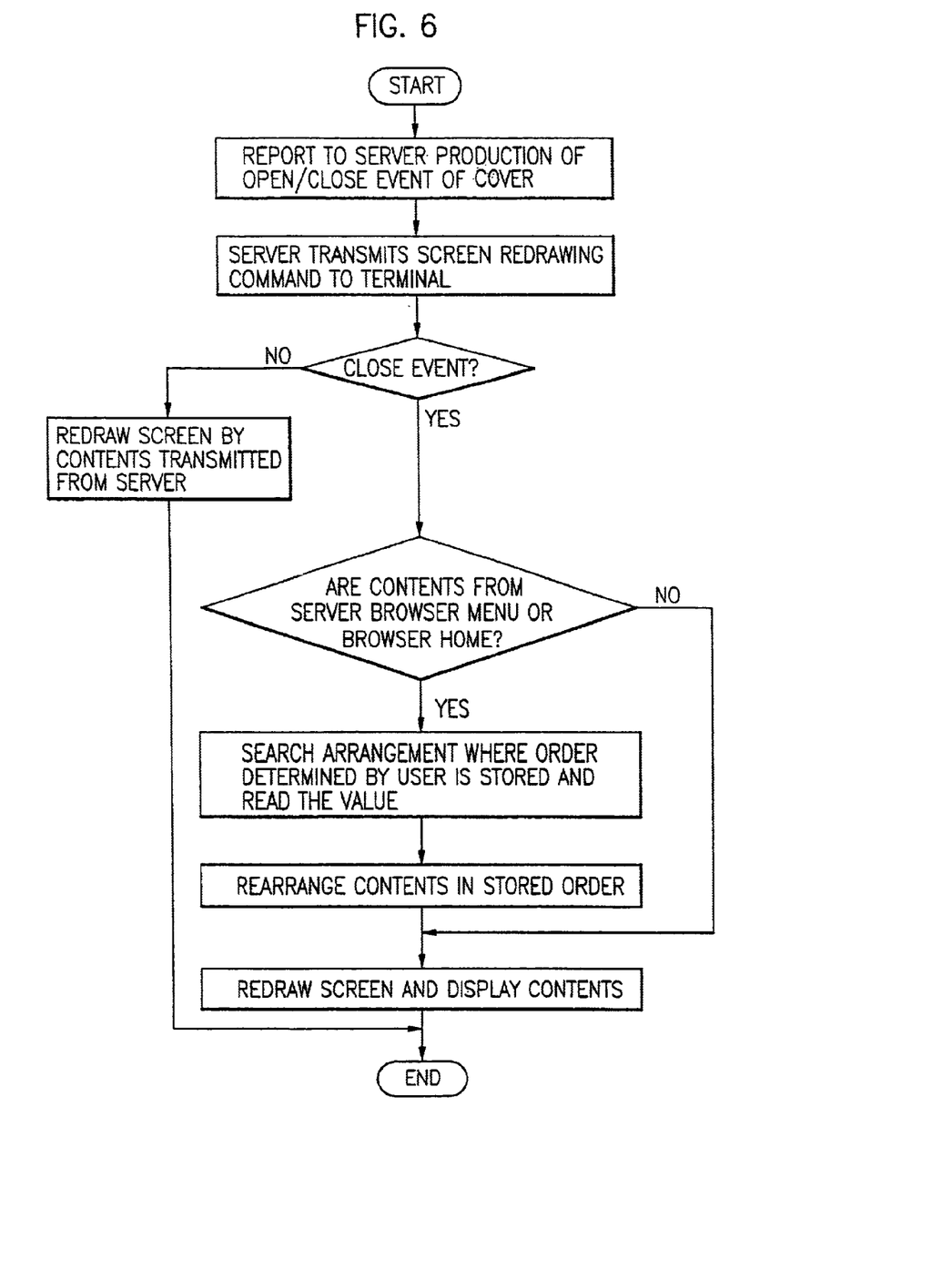
FIG. 6 is a flowchart illustrating the cellular phone operating method according to a preferred embodiment of the present invention.

FIG. 6 illustrates the method of operating the cellular phone according to the present invention. First, the open/close state of the cover 20 is detected and then transmitted from the cellular phone to the server 36. When the open/close state is received, the server 36 transmits to the cellular phone the display that corresponds to the screen redrawing command and the exposed screen size.

If the cover 20 is opened, the server 36 transmits to the cellular phone the display information corresponding to the large-sized screen, and the display device 30 of the cellular phone redraws the screen by the display information corresponding to the large-sized screen to terminate the program.

If the cover 20 is closed, the cellular phone judges whether the display information transmitted from the server 36 is the display information predetermined by the user. If it is judged that the transmitted display information is not the display information predetermined by the user, the transmitted display information is considered as the general information corresponding to the large-sized screen, and the server 36 transmits to the cellular phone the display information corresponding to the small-sized screen. The cellular phone redraws the screen of the exposed display device 30 by the received display information corresponding to the small-sized screen, and then the program is terminated.

Meanwhile, if the transmitted display information includes the information predetermined by the user, the exposed screen is redrawn by rearranging items of the menu in a manner that the information predetermined by the user is preferentially displayed. In other words, the cellular phone displays the information on the exposed screen of the display device 30 according to the open/close state of the cover 20 so that the user can actually view the information. This process can be performed by a simple contact with a pen using the touch panel.

In the first preferred embodiment of the present invention, the cellular phone is taken as an example, but the present invention can be applied to cases that require the compatibility among communication devices having different screen sizes such as IMT2000, TRS, PDA, etc.

As described above, the external server having the database provides to the cellular phone display the information suitable for the exposed screen size of the display device in accordance with the open/close state of the cover of the cellular phone. Accordingly, the display information is displayed on the display device so that it matches the size of the exposed screen, and the information predetermined by the user is preferentially displayed on the display device.

Further, the user can input necessary command information to the cellular phone through the touch panel instead of the keypad. According to the present invention, the information desired by the user can be displayed on the display device irrespective of the open/close state of the cover, and the compatibility among the communication devices having different sizes of screen.

Second Preferred Embodiment

Figure 7A:
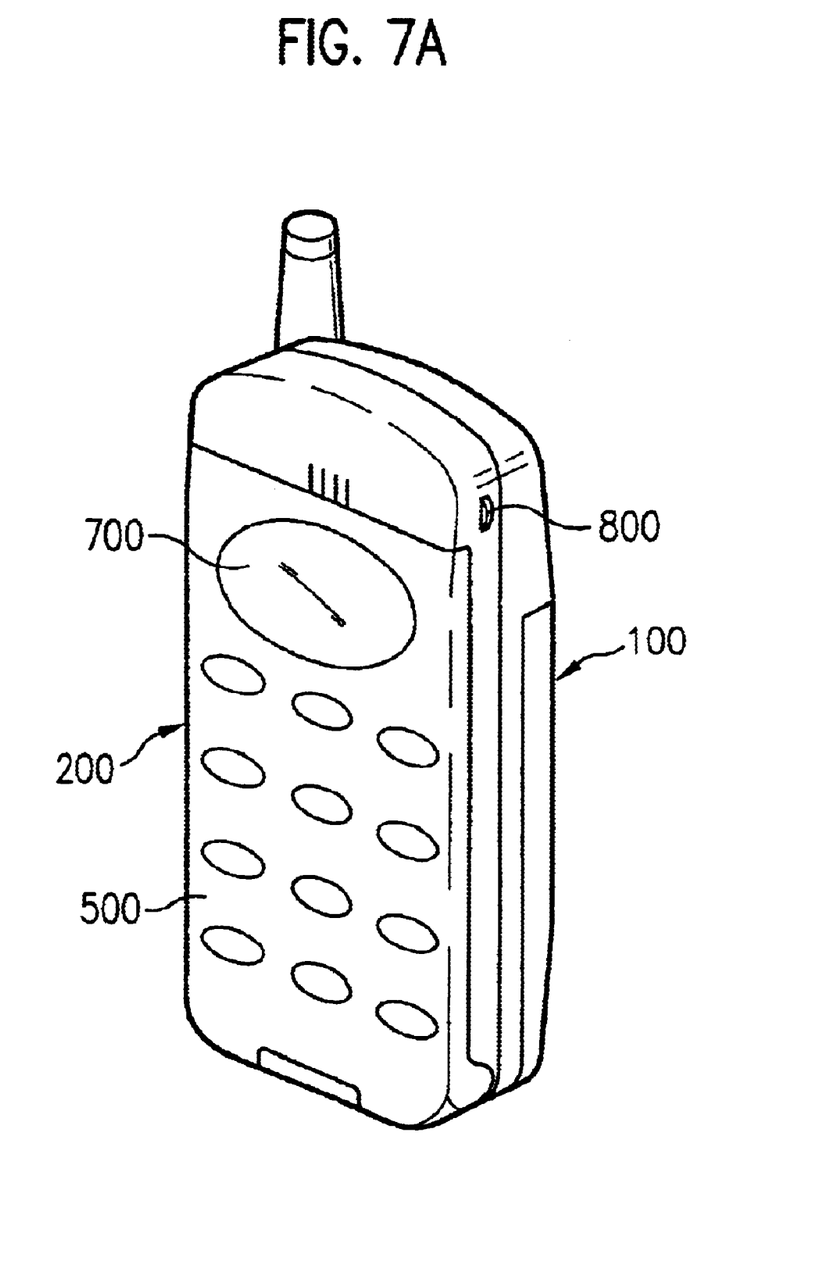
FIG. 7A is a diagram illustrating the external shape of the cellular phone with its cover closed according to a preferred second embodiment of the present invention.
Figure 7B:
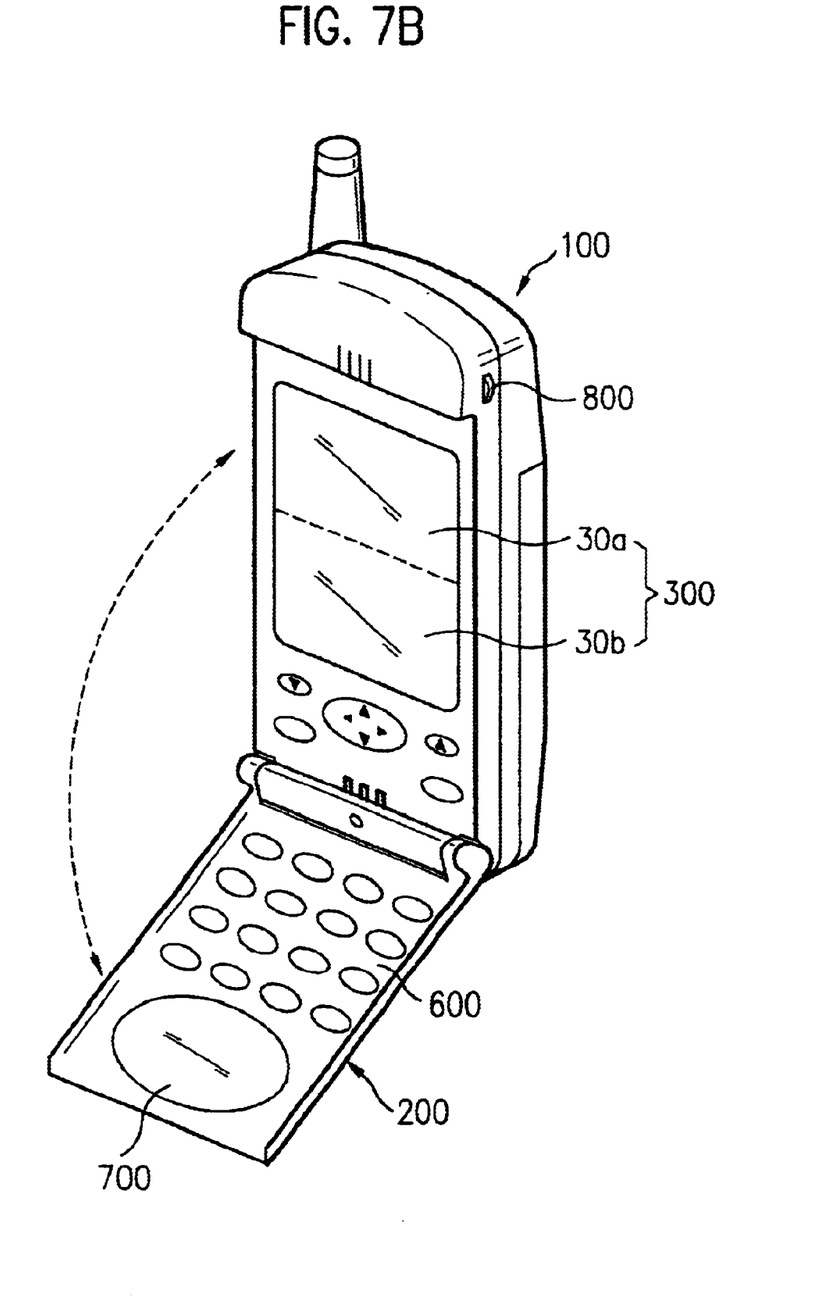
FIG. 7B is a diagram illustrating the external shape of the cellular phone with its cover opened according to the preferred second embodiment of the present invention.

FIG. 7A is a diagram illustrating the external shape of the cellular phone with its cover closed according to the second embodiment of the present invention, and FIG. 7B is a diagram illustrating the external shape of the cellular phone with its cover opened according to the second embodiment of the present invention.

Referring to FIGS. 7A and 7B, the cellular phone includes a main body or housing 100 and a cover 200.

The main body 100 includes a display device 300 and a keypad 400 preferably having an area smaller than that of the display device 300. The cover 200 is rotatably mounted on the main body 100, and has a front keypad 500 and a rear keypad 600 provided on the front and rear surfaces thereof, respectively, and a window 700 formed on an upper portion thereof. The cover 200 has an area almost the same as that of the front surface of the main body 100, and thus when the cover 200 is in the close state, a portion of the display device 300 is exposed through the window 700. The window 700 is preferably a transparent material such as a plastic or glass, or may assume an open form. The reference numeral 800 denotes the open/send/end button as in the preferred first embodiment.

The cellular phone of the preferred second embodiment is similar to that of the first embodiment except that the cover 200 has almost the same area as the front surface of the main body 100, and the window 700 is provided on the upper portion of the cover 200. Accordingly, the detailed explanation thereof will be omitted.

As described above, the cellular phone according to the preferred first and second embodiments of the present invention can perform the mobile communication service and the mobile Internet service as well. Further, since the cellular phone according to the present invention has several keypads, it can support the Internet service that require a number of buttons (or keys). Especially, several hot keys for the user's convenience during the Internet connection are provided on the cellular phone, and thus the user can easily access the Internet through the WAP browser.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A mobile terminal, comprising:
   a main body comprising a display device provided on a front surface thereof and a first keypad; and
   a cover comprising a second keypad provided on a front surface thereof, and a third keypad provided on a rear surface thereof, wherein said cover is configured to move such that the rear surface of the cover overlaps with the front surface of the main body when the mobile terminal is closed so as to cover a first portion of the display device when the cover is closed, leaving a second portion of the display device viewable, wherein information displayed on both the first and second portions of the display device when the mobile terminal is open is redrawn based on a display area of the second portion of the display device and user preferences for display on the second portion when the mobile terminal is closed.

2. The mobile terminal of claim 1, wherein the second keypad comprises at least one of a number key, a character key, and a function key for a mobile communication.

3. The mobile terminal of claim 1, wherein the third keypad comprises at least one number key, a character key, and a function key for a mobile Internet service.

4. The mobile terminal of claim 1, wherein the first keypad is positioned under the display device provided on the front surface of the main body, and includes at least one key for both mobile Internet use and mobile communication use.

5. The mobile terminal of claim 1, wherein the cover comprises a flip-type cover or a folder-type cover.

6. The mobile terminal of claim 1, wherein the main body includes a button configured to open the mobile terminal, to initiate a communication service, and to terminate a communication service.

7. The mobile terminal of claim 1, wherein keys arranged on the first and third keypads are operable when the mobile terminal is open.

8. The mobile terminal of claim 1, wherein an uncovered portion of the display device is configured to display mobile communication information.

9. The mobile terminal of claim 1, wherein the first keypad occupies an area on the main body which is smaller than an area on the main body which is occupied by the display device.

10. The mobile terminal of claim 1, wherein at least one of a number key, a character key, and a function key for mobile communication is arranged on the second keypad, at least one of a number key, a character key, and a function key for all mobile Internet service is arranged on the third keypad, and at least one key for both mobile Internet service and mobile communication service is arranged on the first keypad.

11. The mobile terminal of claim 1, further comprising a fixed cover attached to the main body and configured to cover a portion of the front surface of the main body not covered by the cover, and having a window configured to expose the second portion of the display device.

12. The mobile terminal of claim 1, wherein the mobile terminal is configured to operate in at least two modes when the mobile terminal is open.

13. The mobile terminal of claim 12, wherein one of the at least two modes of operation when the terminal is open comprises a data communication code.

14. The mobile terminal of claim 12, wherein one of the at least two modes of operation when the terminal is open comprises a voice communication mode.

15. The mobile terminal of claim 14, wherein the voice communication mode comprises a hands-free speakerphone mode.

16. The mobile terminal of claim 14, wherein the voice communication mode comprises a hand held mode.

17. A mobile terminal, comprising:
a main body comprising a display device and a first keypad provided on a front surface thereof; and
a cover comprising a window, wherein said cover is configured to move such that a rear surface of the cover overlaps the front surface of the main body in such a way that a first portion of the display device is viewable through the window when the mobile terminal is closed, and a second portion of the display device is viewable when the mobile terminal is open, and wherein information to be displayed on the display device is redrawn based on the opened/closed state of the cover.

18. The mobile terminal of claim 17, wherein the window comprises a transparent material or an opening in the cover.

19. The mobile terminal of claim 17, wherein the cover comprises one of a flip-type cover and folder-type cover.

20. The mobile terminal of claim 17, wherein mobile communication information displayed on the first portion of the display device is viewable through the window when the mobile terminal is closed.

21. The mobile terminal of claim 17, wherein the main body includes a button configured to open the mobile terminal, to initiate communication service, and to terminate communication service.

22. The mobile terminal of claim 17, wherein keys arranged on the first keypad and on another keypad provided on a rear surface of the cover are operable when the mobile terminal is opened.

23. The mobile terminal of claim 17, wherein at least one of a number key, character key, and a function key for a mobile communication is arranged on a second keypad provided on a front surface of the cover, at least one of a number key, character key, and a function key for mobile Internet service is arranged on a third keypad provided on the rear surface of the cover, and at least one key for both mobile Internet and mobile communication service is arranged on the first keypad.

24. The mobile terminal of claim 17, wherein the mobile terminal is configured to operate in at least two modes when the mobile terminal is open.

25. The mobile terminal of claim 24, wherein one of the at least two modes of operation when the terminal is open comprises a data communication mode.

26. The mobile terminal of claim 24, wherein one of the at least two modes of operation when the terminal is open comprises a voice communication mode.

27. The mobile terminal claim 26, wherein the voice communication mode comprises a hands-free speakerphone mode.

28. The mobile terminal claim 26, wherein the voice communication mode comprises a hand held mode.

29. A method of operating a mobile terminal which includes a main body having a display device and a keypad provided on a front surface thereof, and a cover configured to move relative to the main body and having keypads provided on both front and rear surfaces thereof, the method comprising:
transmitting an open/close state of the mobile terminal to a server;
determining a display area which corresponds to the open/close state of the mobile terminal, and redrawing display information based on the determined display area and user preferences, if necessary;
receiving display information from the server which conforms with a screen size corresponding to the open/close state of the mobile terminal; and
displaying the received information through the display device.

30. The method of claim 29, wherein the mobile terminal comprises an internal browser configured to transmit information on the open/close state of the mobile terminal to an external server, and wherein the external server comprises a database configured to store the display information, and a browser client configured to provide the corresponding display information to the mobile terminal based on the open/close state of the mobile terminal.

31. The method of claim 30, further comprising the browser client requesting the corresponding display information from the database in accordance with the information on the received open/close state of the mobile terminal, adjusting the display information received from the database to match the current screen size of the mobile terminal, and providing the adjusted display information to the mobile terminal.

32. The method of claim 29, wherein transmitting the open/close state of the mobile terminal to the server further comprises providing the open/close state information on a header portion of data to be transmitted to the server.

33. The method of claim 29, wherein the keypad includes a touch panel configured to allow a user to input information.

34. A method of operating a mobile terminal which includes a main body with a display device and a keypad provided on a front surface thereof, and a cover configured to move relative to the main body and having keypads provided on both front and rear surfaces thereof, the method comprising:
(a) detecting and transmitting an open/close state of the mobile terminal to an external server, and then receiving from the server a screen redrawing command and display information that matches a size of an exposed screen of the display device;
(b) if the mobile terminal is open, receiving display information corresponding to a large-sized screen from the external server, and redrawing the large-sized screen based on the display information received;
(c) if the mobile terminal is closed, judging whether the display information transmitted from the server includes information predetermined by a user;
(d) if it is judged that the display information transmitted from the server does not include information predetermined by a user, redrawing the screen of the display device based on display information corresponding to a small-sized screen received from the server; and
(e) if it is judged that the display information transmitted from the server includes information predetermined by a user, rearranging the display information in accordance with the order determined by the user, and then redrawing the screen of the display device based on the rearranged display information.

35. An improvement for a communication device having a main body with a display of a prescribed size on a front surface thereof, the improvement comprising:

a first cover having a front and rear surface, wherein the first cover is configured to move such that the rear surface of the first cover overlays the front surface of the main body when the first cover is in a closed state so as to overlap a first portion of the display, wherein a first keypad is formed on the front surface of the first cover; and a second cover permanently mounted to the main body and configured to cover a second portion of the display when the second cover is closed, wherein the second cover includes a window, said window comprising a prescribed display viewing area.

36. The improvement for a communication device of claim 35, wherein the first cover is configured to overlay the display, and wherein the second cover comprises a window, said window comprising a prescribed display viewing area.

37. The improvement for a communication device of claim 35, wherein the first cover comprises one of a flip-type cover and a folder-type cover.

38. The improvement for a communication device of claim 35, further comprising a second keypad provided on the rear surface of the first cover.

39. The improvement for a communication device of claim 38, further comprising a third keypad provided on the front surface of the main body.

40. The improvement for a communication device of claim 39, wherein at least one of the first, second, and third keypads includes a touch pad.

41. The improvement for a communication device of claim 39, wherein the third keypad occupies an area on the front surface of the main body which is less than the area occupied by the display.

42. The improvement for a communication device of claim 38, wherein the main body includes a button configured to open the first cover, to initiate a call, and to terminate a call.

43. A mobile communication terminal, comprising:

a main body, comprising display device and a first keypad provided on a front surface thereof;

a first cover comprising a second keypad provided on a front surface thereof, and a third keypad provided on a rear surface thereof, wherein the first cover is configured to move such that the rear surface of the first cover overlaps with the front surface of the main body when the mobile terminal is closed, and wherein the first cover is configured to cover at least a first portion of the display device when the mobile terminal is closed; and a second cover fixed to the main body and configured to cover a second portion of the front surface of the main body not covered by the first cover, and having a window configured to expose a second portion of the display device.

* * * * *